US010699190B1

(12) United States Patent
Rotem et al.

(10) Patent No.: US 10,699,190 B1
(45) Date of Patent: Jun. 30, 2020

(54) SYSTEMS AND METHODS FOR EFFICIENTLY UPDATING NEURAL NETWORKS

(71) Applicant: Facebook, Inc., Menlo Park, CA (US)

(72) Inventors: Nadav Rotem, Santa Clara, CA (US); Abdulkadir Utku Diril, Menlo Park, CA (US); Mikhail Smelyanskiy, Burlingame, CA (US); Jong Soo Park, Mountain View, CA (US); Christopher Dewan, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 241 days.

(21) Appl. No.: 15/911,120

(22) Filed: Mar. 4, 2018

(51) Int. Cl.
*G06F 21/60* (2013.01)
*H04L 29/06* (2006.01)
*G06N 3/08* (2006.01)
*G06N 3/10* (2006.01)

(52) U.S. Cl.
CPC ............... *G06N 3/08* (2013.01); *G06N 3/10* (2013.01)

(58) Field of Classification Search
CPC .. G06N 3/08; G06N 3/10; G06N 3/04; G06N 3/063; G06N 3/088; G06N 3/0454; G06F 21/602; H04L 9/06565; H04L 9/0464; H04L 9/0435
See application file for complete search history.

(56) References Cited

U.S. PATENT DOCUMENTS

| 9,524,370 | B2 * | 12/2016 | Raisaro | H04L 9/008 |
| 2014/0180989 | A1 * | 6/2014 | Krizhevsky | G06N 3/063 706/31 |
| 2017/0070517 | A1 * | 3/2017 | Bailey | H04L 63/20 |
| 2017/0372201 | A1 * | 12/2017 | Gupta | G06N 3/084 |
| 2018/0096078 | A1 * | 4/2018 | Leeman-Munk | G06N 3/0454 |
| 2018/0322383 | A1 * | 11/2018 | Feng | G06N 3/04 |
| 2018/0336881 | A1 * | 11/2018 | Reber | G06K 9/6262 |
| 2019/0005375 | A1 * | 1/2019 | Mody | G06N 3/04 |
| 2019/0147344 | A1 * | 5/2019 | Zhang | G06N 3/084 706/25 |
| 2019/0296910 | A1 * | 9/2019 | Cheung | G06N 3/0481 |
| 2019/0334716 | A1 * | 10/2019 | Kocsis | H04L 63/0442 |

OTHER PUBLICATIONS

Rotem, et al., Systems and Methods for Protecting Neural Network Weights, Co-pending U.S. Appl. No. 15/903,162, filed Feb. 23, 2018.

* cited by examiner

*Primary Examiner* — Amir Mehrmanesh
(74) *Attorney, Agent, or Firm* — FisherBroyles, LLP

(57) ABSTRACT

The disclosed computer-implemented method for efficiently updating neural networks may include (i) identifying a neural network that comprises sets of interconnected nodes represented at least in part by a plurality of matrices and that is trained on a training computing device and executes on at least one endpoint device, (ii) constraining a training session for the neural network to reduce the size in memory of the difference between the previous values of the matrices prior to the training session and the new values of the matrices after the training session, (iii) creating a delta update for the neural network that describes the difference between the previous values and the new values, and (iv) updating the neural network on the endpoint device to the new state by sending the delta update from the training computing device to the endpoint computing device. Various other methods, systems, and computer-readable media are also disclosed.

16 Claims, 6 Drawing Sheets

SYSTEMS AND METHODS FOR
EFFICIENTLY UPDATING NEURAL
NETWORKS

BACKGROUND

Software on mobile devices is used by billions of users around the world and is frequently updated over limited bandwidth connections, such as cellular data plans. In many cases, software developers may attempt to reduce the size of software updates in order to minimize the amount of bandwidth consumed by such updates. One technique that's frequently applied to software updates is the delta update. In a delta update, rather than sending the entire software package again, the old software is compared to the new version and a delta file describing the changes is produced. The delta update is sent to the user's mobile device where the delta update is applied to the old version of the software to generate the new version of the software. The delta update is typically much smaller than the whole program, and thus bandwidth and storage are saved.

Unfortunately, this approach may not be nearly as effective for neural networks, which are often represented as a group of large numeric matrices. In many cases, each new training or update of the neural network may produce a completely different group of matrices with little relation in values to those trained before, meaning that the delta update approach may not produce significantly smaller files than sending the entirety of the new version of the neural network. The instant disclosure, therefore, identifies and addresses a need for systems and methods for efficiently updating neural networks.

SUMMARY

As will be described in greater detail below, the instant disclosure describes systems and methods for efficiently updating neural networks by constraining neural network training via a loss function that reduces the size of the difference between the matrices that represent the neural network before and after training.

In one example, a computer-implemented method for efficiently updating neural networks may include (i) identifying a neural network that includes sets of interconnected nodes represented at least in part by a group of matrices and that is trained on a training computing device and executes on at least one endpoint device, (ii) constraining a training session for the neural network to reduce a size in memory of a difference between a previous set of values of the matrices representing the neural network prior to the training session and a new set of values of the matrices representing the neural network after the training session, (iii) creating a delta update for the neural network that describes the difference between the previous set of values of the matrices and the new set of values of the matrices, and (iv) updating the neural network on the endpoint device to the new state by sending the delta update from the training computing device to the endpoint computing device.

In some examples, constraining the training session for the neural network to reduce the size in memory of the difference between the previous set of values prior to the training session and the new set of values after the training session may include applying a loss function to the difference between the previous set of values and the new set of values. Additionally or alternatively, constraining the training session for the neural network to reduce the size in memory of the difference between the previous set of values and the new set of values reduces a size of a data transmission between the training computing device and the endpoint device. In some examples, constraining the training session for the neural network may be in response to determining that the endpoint device is a mobile device with limited computing resources.

In one embodiment, the matrices may each include a set of weights that are each represented as a numeric value. In some embodiments, constraining the training session for the neural network to reduce the size in memory of the difference between the previous set of values and the new set of values may include reducing an absolute value of at least one numeric value that represents a difference between a weight within the previous set of values and a weight within the new set of values.

In some examples, constraining the training session for the neural network to reduce the size in memory of the difference between the previous set of values and the new set of values may include reducing a quantity of non-zero values in a set of matrices that represent the difference. In some embodiments, creating the delta update for the neural network may include creating a set of matrices that, when used to perform an element-wise addition operation upon the previous set of values, produce the new set of values.

Additionally or alternatively, constraining the training session for the neural network may include constraining the training session to produce a difference with a limited set of distinct values and thereby improve a compressibility of the difference. In some embodiments, creating the delta update may include performing a compression operation on data that describes the difference between the previous set of values of the matrices and the new set of values of the matrices.

In one embodiment, a system for implementing the above-described method may include several modules stored in memory, including (i) an identification module that identifies a neural network that includes sets of interconnected nodes represented at least in part by a group of matrices and that is trained on a training computing device and executes on at least one endpoint device, (ii) a constraint module that constrains a training session for the neural network to reduce a size in memory of a difference between a previous set of values of the matrices representing the neural network prior to the training session and a new set of values of the matrices representing the neural network after the training session, (iii) a creation module that creates a delta update for the neural network that describes the difference between the previous set of values of the matrices and the new set of values of the matrices, (iv) an update module that updates the neural network on the endpoint device to the new state by sending the delta update from the training computing device to the endpoint computing device, and (v) at least one physical processor that executes the identification module, the constraint module, the creation module, and the update module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a neural network that includes a group of sets of interconnected nodes represented at least in part by a group of matrices and that is trained on a training computing device and executes on at least one endpoint device, (ii) constrain a training session for the neural network to reduce a size in memory of a difference between a previous set of values of the matrices representing the neural network prior to the training session and a new set of values of the matrices representing the neural network after the training session, (iii) create a delta update for the neural network that describes the difference between the previous set of values of the matrices and the new set of values of the matrices, and (iv) update the neural network on the endpoint device to the new state by sending the delta update from the training computing device to the endpoint computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
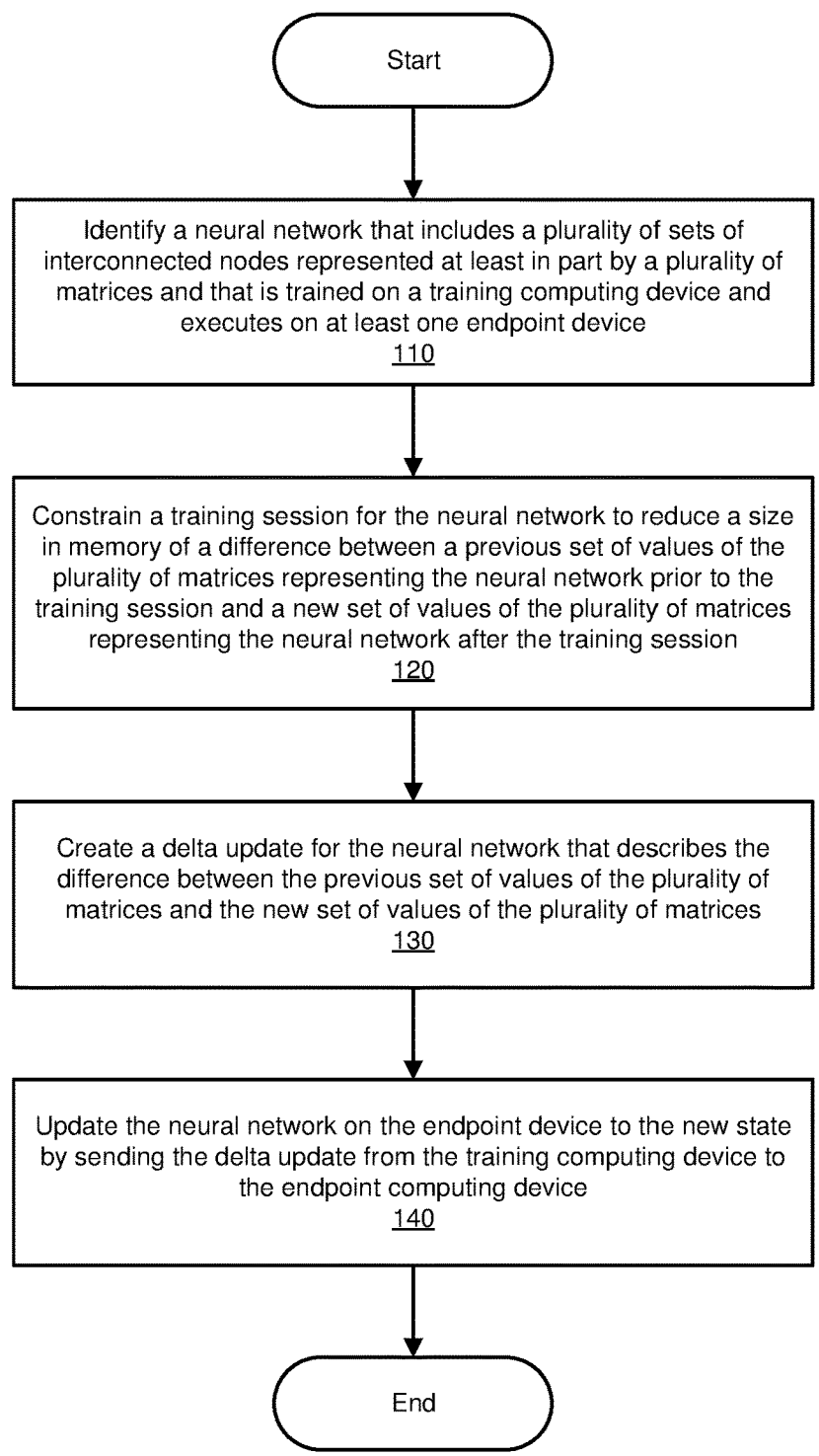
FIG. 1 is a flow diagram of an exemplary method for efficiently updating neural networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for updating neural networks efficiently on devices that have limited computing resources and/or limited bandwidth to receive updates. As will be explained in greater detail below, by constraining the training of a neural network to minimize the size in memory and/or improve the compressibility of the difference between the previous values and the new values, the systems and methods described herein may create delta updates for neural networks that consume less memory and/or bandwidth than if the training were not constrained in such a manner, enabling the systems and methods described herein to update instances of the neural network on remote devices more efficiently. In addition, the systems and methods described herein may improve the functioning of a computing device by reducing the resources required to update a neural network on the computing device, freeing up additional computing resources for other tasks. These systems and methods may also improve the field of machine learning by enabling neural networks that perform machine learning tasks to be updated more efficiently and/or frequently on a wide variety of device types.

Figure 5:
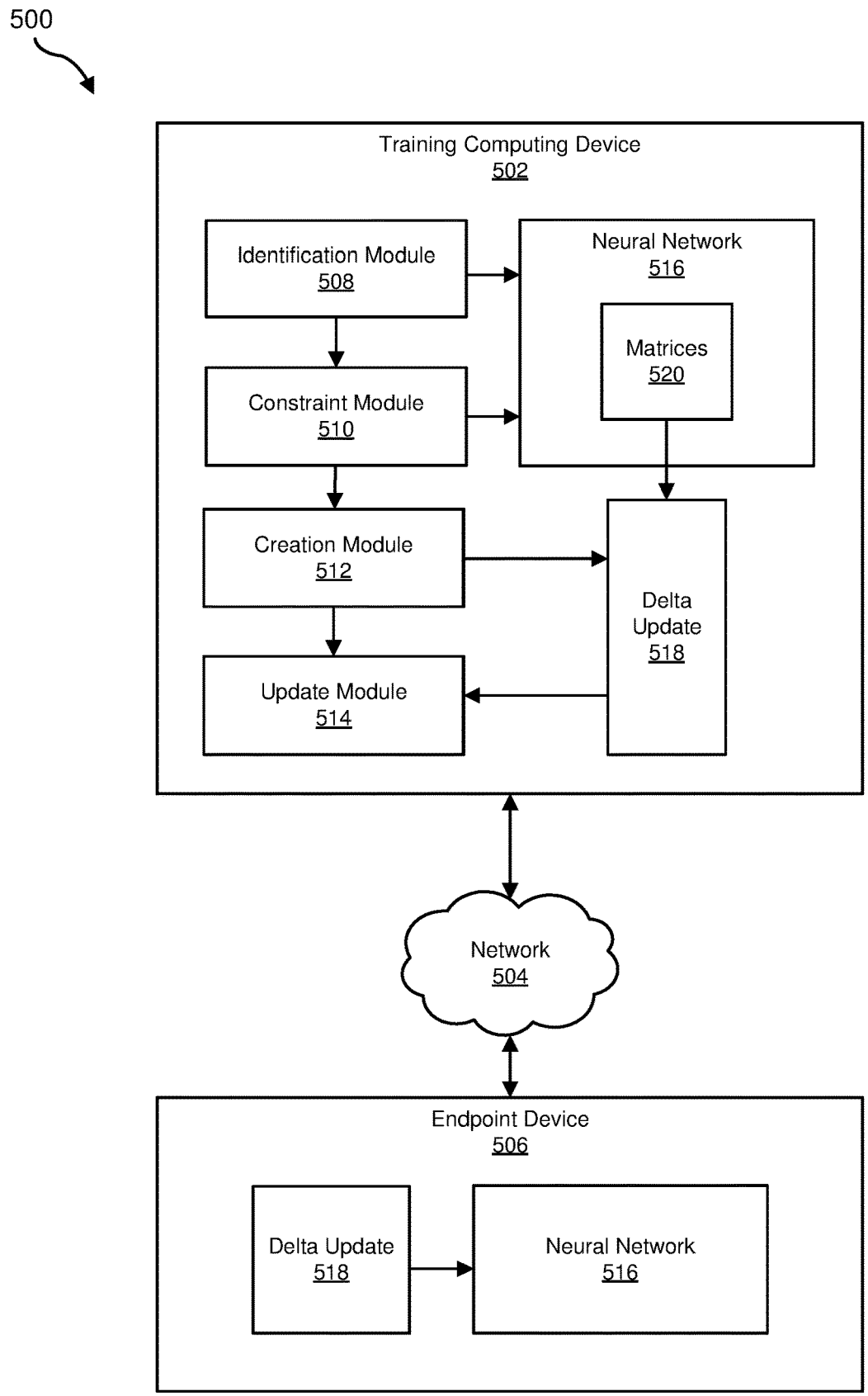
FIG. 5 is a block diagram of an exemplary computing system for efficiently updating neural networks.
Figure 6:
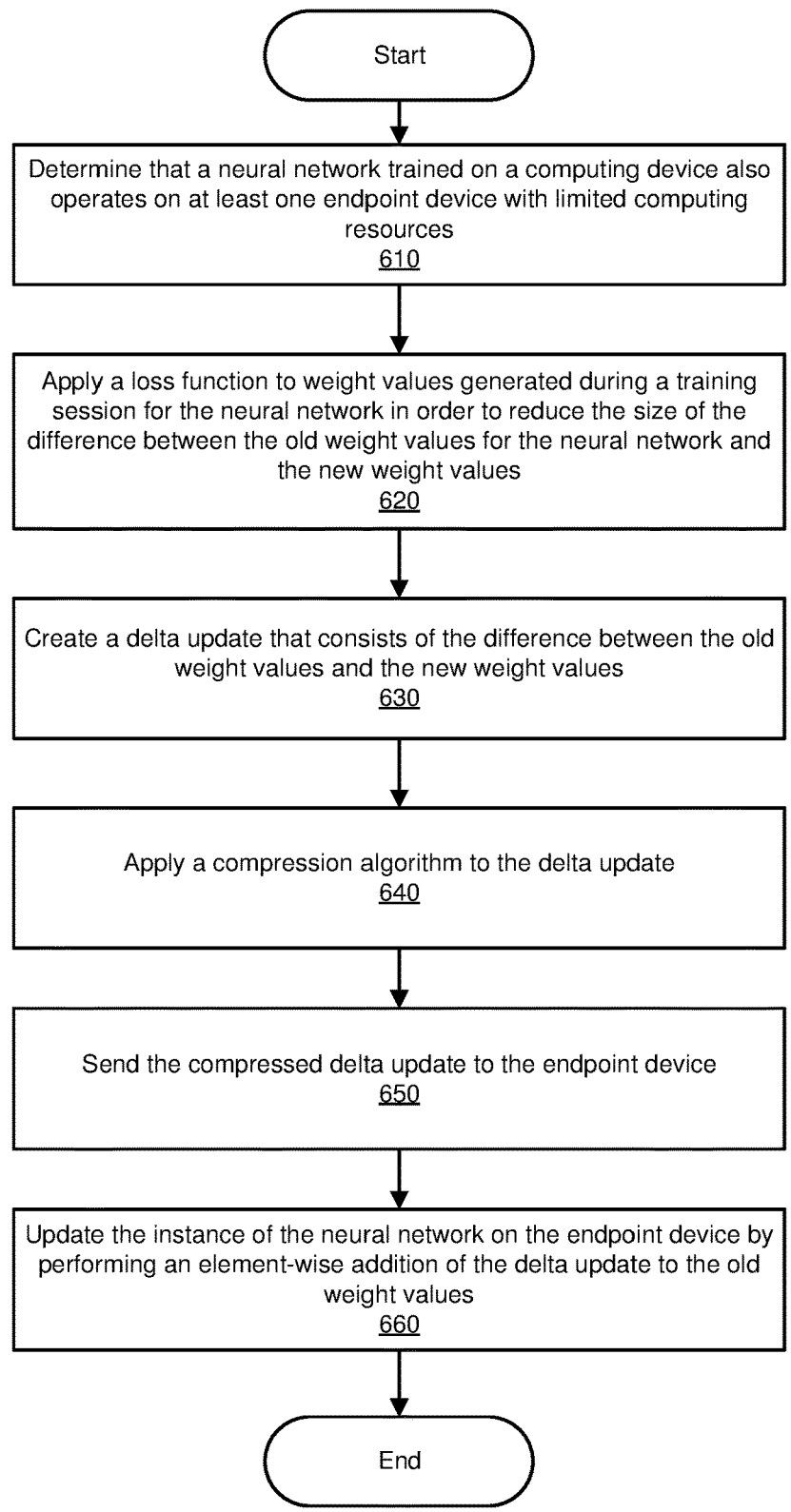
FIG. 6 is a flow diagram of an exemplary method for efficiently updating neural networks.

The following will provide, with reference to FIGS. 1 and 6, detailed descriptions of exemplary methods for efficiently updating neural networks. Detailed descriptions of an exemplary neural network will be provided in connection with FIG. 2. In addition, detailed descriptions of exemplary systems for efficiently updating neural networks will be provided in connection with FIGS. 3 and 5, and detailed descriptions of exemplary matrices will be provided in connection with FIG. 4.

FIG. 1 is a flow diagram of an exemplary computer-implemented method 100 for efficiently updating neural networks. The steps shown in FIG. 1 may be performed by any suitable computer-executable code and/or computing system, including the system illustrated in FIG. 5. In one example, each of the steps shown in FIG. 1 may represent an algorithm whose structure includes and/or is represented by multiple sub-steps, examples of which will be provided in greater detail below.

As illustrated in FIG. 1, at step 110 one or more of the systems described herein may identify a neural network that includes a plurality of sets of interconnected nodes represented at least in part by a plurality of matrices and that is trained on a training computing device and executes on at least one endpoint device.

In some examples, the term "neural network," as used herein, may refer to a physical or virtual computing system that contains a collection of connected nodes. In some embodiments, nodes may be organized into layers and may be connected to some or all nodes in adjacent layers. In some embodiments, the connections between nodes may be regulated by a weight that the receiving node assigns to information from the sending node. In one embodiment, weights, and therefore the organization of and connections between nodes, may be represented as numerical data stored in a set of matrices. In some examples, weights may be expressed as integer values, while in other examples, weights may include non-integer values.

In some examples, the term "node," as used herein, may refer to a mathematical function that represents an artificial neuron within a neural network. In some embodiments, a node may receive one or more inputs from nodes in another layer, apply an activation function to the input, and send the result to one or more additional nodes in a different layer. In some embodiments, a node may also receive input in the form of a bias, a static term that is added to all output produced by the node. In some examples, a bias may be used to perform an affine transformation on data produced by the node and/or the neural network. In some embodiments, all nodes within the same layer may have the same bias. In one embodiment, bias information for a layer of nodes may be stored alongside weight information for the layer of nodes.

In some examples, the term "training computing device," as used herein, may refer to a computing device on which a neural network is trained. In some embodiments, a training computing device may include a server and/or cluster of servers. In some examples, the term "endpoint computing device," as used herein, may refer to a computing device operated by an end user. Examples of endpoint computing devices may include, without limitation, desktops, laptops, tablets, smartphones, smart clothing, embedded devices, gaming systems, and/or smart appliances. In some embodiments, an endpoint device may have limited computing resources compared to a training computing device. For example, the systems described herein may train a neural network on a server and then send the neural network data to a tablet computer. Additionally or alternatively, an endpoint computing device may have limited bandwidth for receiving data such as neural network updates. For example, an endpoint computing device may be a mobile phone that can only download a limited amount of data per month due to a cellular data plan.

The systems described herein may perform step 110 in a variety of contexts. In one example, the systems described herein may identify a neural network that is trained on one or more servers and performs tasks on one or more endpoint devices. For example, the systems described herein may identify a neural network that is trained to recognize visual objects. In another example, the systems described herein may identify a neural network that is trained to perform voice recognition and/or analyze verbal information to detect commands, keywords, and/or other pertinent information.

Figure 2:
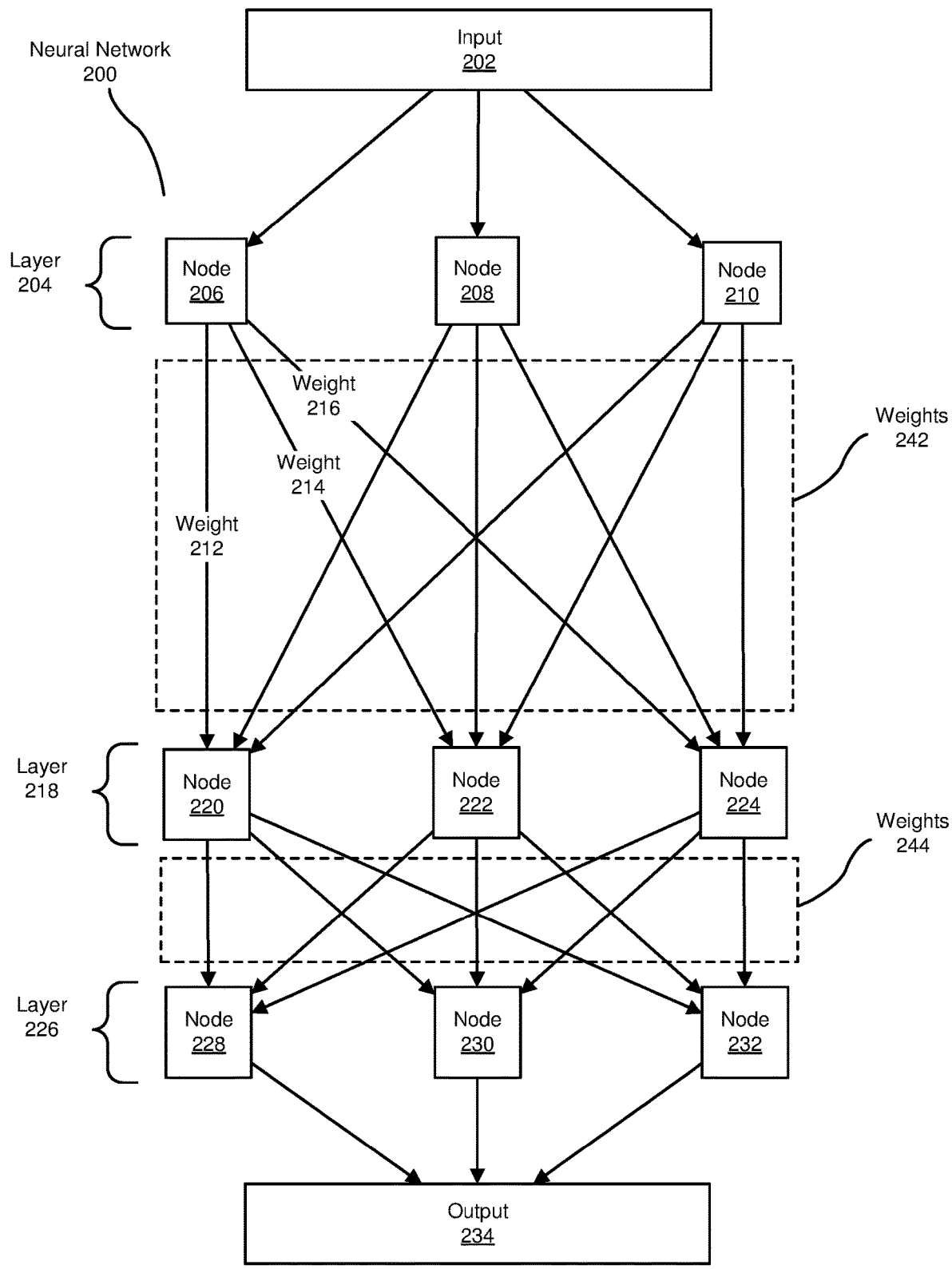
FIG. 2 is a block diagram of an exemplary neural network.

In some embodiments, a neural network may consist of several layers of nodes connected by connections that each have a weight. For example, as illustrated in FIG. 2, a neural network 200 may receive input 202 to an input layer 204 that includes nodes 206, 208, and/or 210. In some examples, node 206 may have input to node 220 weighted with weight 212, input to node 222 weighted with weight 214, and/or input to node 224 weighted with weight 216. In some examples, weights 242 may represent the weights between the other nodes in layer 204 and the nodes in layer 218. Similarly, weights 244 may represent the weights between the nodes in layer 218 and nodes 228, 230, and/or 232 in layer 226. In some embodiments, the nodes in layer 226 may produce output 234.

Returning to FIG. 1, at step 120, one or more of the systems described herein may constrain a training session for the neural network to reduce a size in memory of a difference between a previous set of values of the matrices representing the neural network prior to the training session and a new set of values of the matrices representing the neural network after the training session.

In some examples, the term "training session," as used herein, may refer to any process during which a neural network is given data in order to improve the performance of the neural network. In some embodiments, a training session may include a defined set of input and/or span of time. In other embodiments, a neural network may be trained continuously and a training session may represent any period during which changes to weights are recorded and/or placed into an update. In some embodiments, a neural network may engage in supervised learning that involves receiving input data that is labelled. Additionally or alternatively, a neural network may engage in unsupervised learning that involves receiving input data that is not labelled. In some examples, a neural network may compare output produced from input data with expected output for the input data in order to determine the accuracy of the neural network. In some embodiments, a neural network may be configured with a backpropagation algorithm that provides feedback to the various elements of the neural network about the accuracy of the output and enables the neural network to adjust the weights between nodes in order to produce more accurate output.

Figure 3:
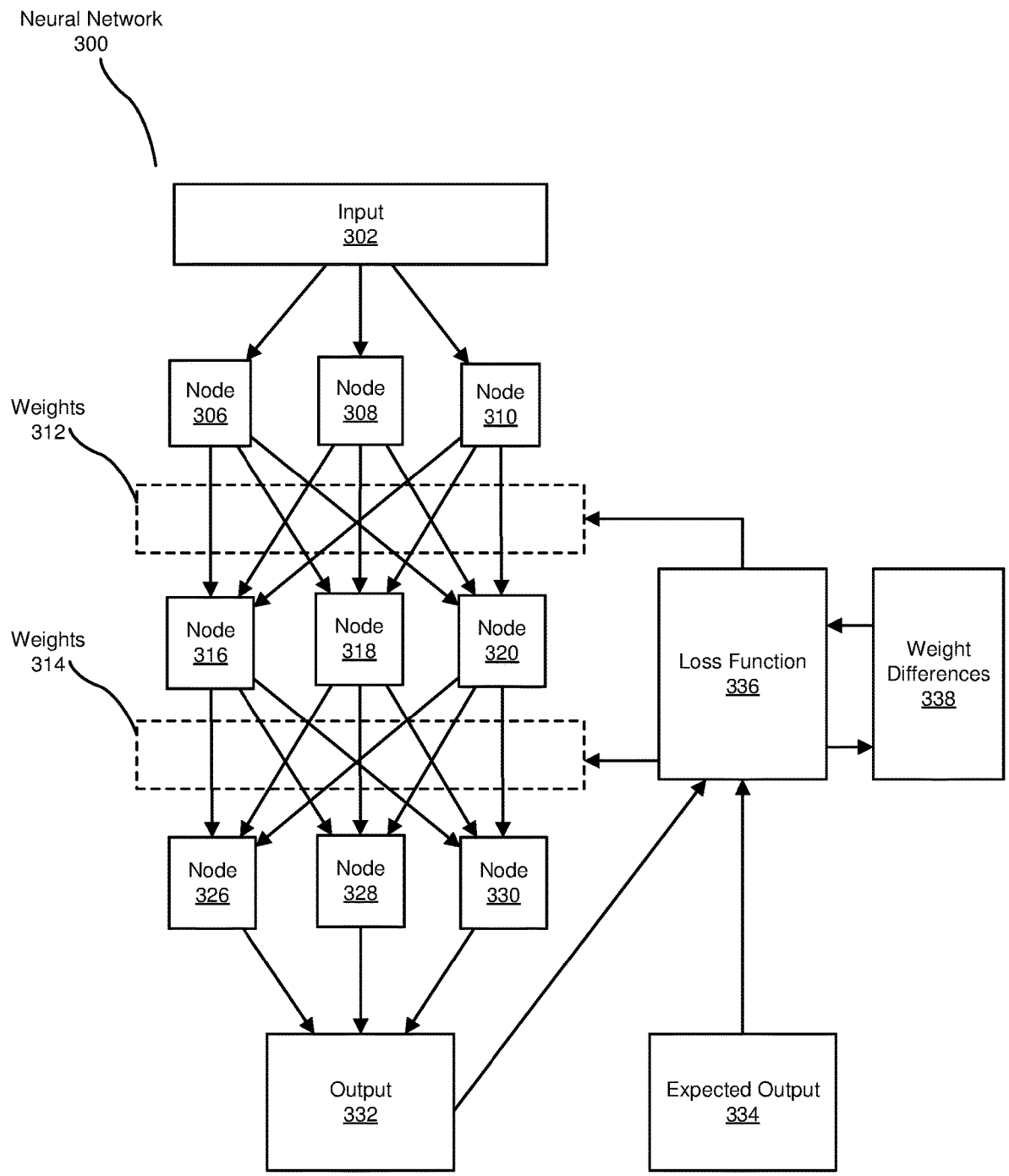
FIG. 3 is a block diagram of an exemplary computing system for efficiently updating neural networks.

In some examples, the systems described herein may constrain the training session for the neural network to reduce the size in memory of the difference between the previous set of values prior to the training session and the new set of values after the training session by applying a loss function to the difference between the previous set of values and the new set of values. For example, as illustrated in FIG. 3, a neural network 300 may include nodes 306, 308, 310, 316, 318, 320, 326, 328, and/or 330. In some examples, neural network 300 may receive an input 302, produce an output 332, and then compare output 332 to an expected output 334. In some embodiments, a loss function 336 may calculate the difference between output 332 and expected output 334. In addition to calculating the difference between output 332 and expected output 334, in some embodiments, loss function 336 may also factor weight differences 338 into calculations in order to minimize the size of weight differences 338 in memory. In some examples, loss function 336 may reduce the size of the difference by assigning a cost to changes in weights and acting to minimize the total cost incurred (while also acting to minimize the cost incurred by producing erroneous output due to suboptimal weights). In some examples, loss function 336 may assign a cost to weight changes with large absolute values, weight changes with unique values, and/or all non-zero weight changes. Additionally or alternatively, loss function 336 may assign a cost to the least significant bits of weight changes, reducing the precision of weight changes. In some examples, the systems described herein may update weights 312 and/or weights 314 with weight differences 338.

In some examples, the term "loss function," as used herein, may refer to a function that maps the values of variables onto a real number representing a cost associated with those values. In some examples, optimizing a system may involve minimizing the output of a loss function; that is, reducing the costs calculated by the loss function by adjusting the values of the variables that contribute to high costs. In some embodiments, a loss function may include a cost function and/or an error function. Examples of cost functions may include, without limitation, least absolute deviations and/or least square errors. In some embodiments, a loss function for training neural networks may include terms describing the difference between the expected output of the neural network and the actual output of the neural network. By minimizing the output of the loss function, the neural network may adjust the values of weights in a way that produces more accurate output. In some embodiments, the systems described herein may add terms to the loss function representing the size of a change in weight, whether or not a weight change is non-zero, the precision of a change in weight, and/or the uniqueness of a change in weight. By adding terms related to the change in weight to the loss function, the systems described herein may constrain the size and/or characteristics of the weight changes generated by the loss function.

In some examples, constraining the size, absolute value, uniqueness, and/or quantity of non-zero values within the weight difference may enable a lossless compression algorithm to more efficiently compress the weight difference. Because lossless compression takes advantage of statistical redundancy, a matrix of weights that is mostly filled with values of zero may be compressed to a smaller size than a matrix of equal dimensions that is mostly filled with non-zero values. Similarly, data that exhibits fewer unique values may be compressed to a smaller size than data that exhibits a greater quantity of unique values. In some types of compression schemes, data within a limited range of possibilities (e.g., weights with limited absolute values) may be compressed to a smaller size than data with a large range of possibilities.

Additionally or alternatively, encoding the data using various encoding schemes may also reduce the size in memory of the weight difference data. For example, reducing the quantity of unique weight changes may make it possible to encode the weight difference data in a smaller size in memory than otherwise. In some embodiments, the systems described herein may select an efficient encoding scheme for data (e.g., made possible by constraining the weight differences) instead of or in addition to compressing the data. In some examples, the systems described herein may select the encoding scheme for the weight differences based on characteristics of the weight differences, such as the quantity of unique values, the range of values, and/or other characteristics.

Figure 4:
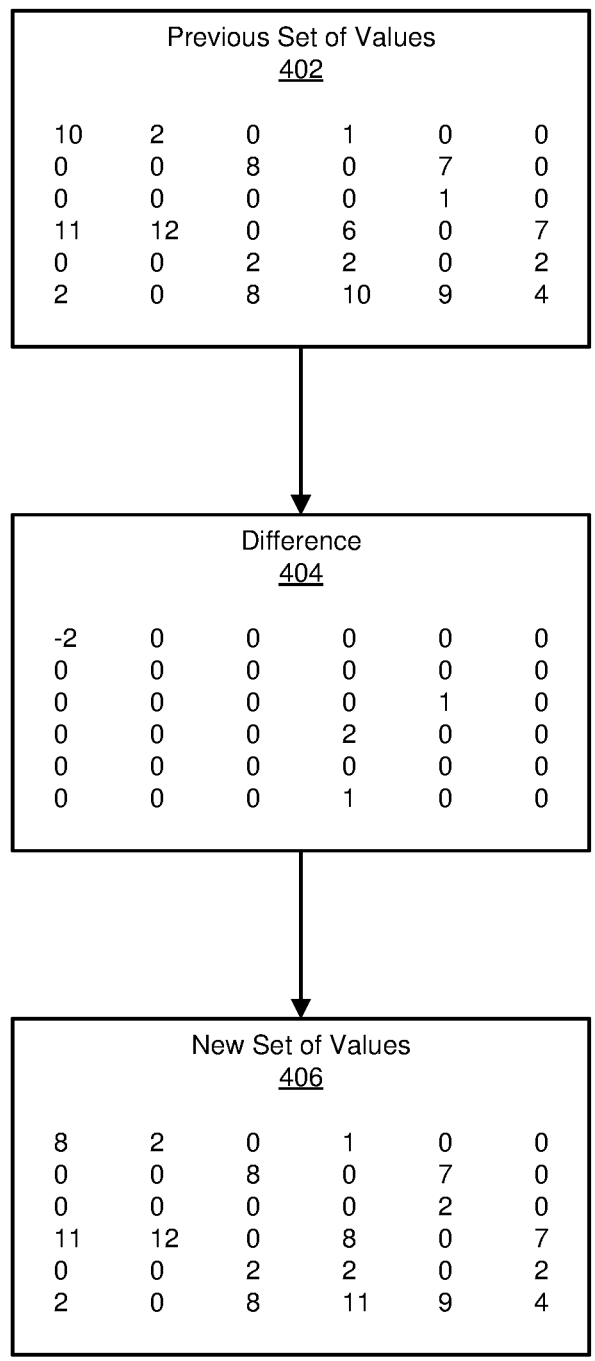
FIG. 4 is a block diagram of exemplary matrices.

In some embodiments, the values of the weights may be represented as matrices and the difference between the previous values and the new values of the weights may also be represented as a matrix. For example, as illustrated in FIG. 4, before training, a neural network may have weights represented by previous set of values 402. After a training session, the neural network may have weights represented by new set of values 406, which may be produced by adding difference 404 to previous set of values 402. In some embodiments, the systems described herein may constrain the training session for the neural network to reduce the size in memory of the difference between the previous set of values and the new set of values by reducing a quantity of non-zero values in a set of matrices that represent the difference. For example, difference 404 has only four non-zero values. If the systems described herein did not apply the loss function to the differences of weights during training, difference 404 may instead have a much higher quantity of non-zero values.

Additionally or alternatively, the systems described herein may constrain the training session for the neural network to reduce the size in memory of the difference between the previous set of values and the new set of values by reducing an absolute value of at least one numeric value that represents a difference between a weight within the previous set of values and a weight within the new set of values. For example, as illustrated in FIG. 4, the values in difference 404 all have an absolute value of 2 or less. In some examples, the differences between the weights may be much higher and constraining the differences to an absolute value of 100 or less may still be an improvement over unconstrained differences with much higher absolute values. In some examples, the systems described herein may constrain the training session for the neural network by constraining the training session to produce a difference with a limited set of distinct values and thereby improve a compressibility and/or efficiency of encoding the difference. For example, by constraining the set of values in difference 404 to [−2, 0, 1, 2], the systems described herein may make it possible to compress difference 404 into a compressed form that occupies less space in memory than if difference 404 had a greater set of distinct values.

In some examples, the systems described herein may constrain the training session for the neural network to reduce the size of a data transmission between the training computing device and the endpoint device. For example, the training computing device may be a server and the endpoint computing device may be a mobile phone with a limited data plan. In this example, the systems described herein may constrain the training session to produce a difference in values that will consume a small amount of the bandwidth allocated to the mobile phone. In some examples, the systems described herein may constrain the training session for the neural network in response to determining that the endpoint device is a mobile device with limited computing resources and/or bandwidth. In some embodiments, the systems described herein may send neural network updates to many systems, some of which are mobile devices and/or have limited computing resources and/or bandwidth.

Returning to FIG. 1, at step 130, one or more of the systems described herein may create a delta update for the neural network that describes the difference between the previous set of values of the plurality of matrices and the new set of values of the plurality of matrices.

In some examples, the term "delta update," as used herein, may refer to any data and/or data transmission that includes data that can be used to update a neural network from a previous state to a new state. In some embodiments, the systems described herein may create the delta update by compressing data that describes the difference between the previous values of the matrices and the new values. In some examples, the delta update may only contain the difference. In other examples, the delta update may contain additional information, such as other changes to the neural network, a version number of the update, and/or updates for an application that executes the neural network on the endpoint computing device.

In some examples, the systems described herein may create the delta update for the neural network by creating a set of matrices that, when used to perform an element-wise addition operation upon the previous set of values, produce the new set of values. For example, returning to FIG. 4, performing an element-wise addition on each element of previous set of values 402 and difference 404 produces new set of values 406. That is, adding the value in the first row and first column of previous set of values 402 to the value in the first row and first column of difference 404 produces the value of the first row and first column in new set of values 406, and so on for the first row and second column, first row and third column, etc., through the sixth row and sixth column. In other examples, the systems described herein may perform a different operation on the previous set of values and the delta update to produce the new set of values. For example, the systems described herein may perform a matrix multiplication operation with a dummy value in order to produce the new set of values.

Returning to FIG. 1, at step 140, one or more of the systems described herein may update the neural network on the endpoint device to the new state by sending the delta update from the training computing device to the endpoint computing device.

The systems described herein may send the delta update in a variety of ways and/or contexts. In some embodiments, the systems described herein may send regular delta updates to endpoint devices that execute the neural network. For example, the systems described herein may send delta updates every week or month. In some examples, the systems described herein may package delta updates differently for transmission to different types of endpoint systems. For example, the systems described herein may create one version of the delta update for mobile phones and another version for laptops.

In some embodiments, the systems described herein may be represented as modules. For example, FIG. 5 is a block diagram of an exemplary computing system 500 for updating neural networks. In some embodiments, a training computing device 502 may communicate with an endpoint computing device 506 via a network 504. In one embodiment, an identification module 508 may identify a neural network 516 that includes sets of interconnected nodes represented at least in part by matrices 520 and that is trained on training computing device 502 and executes on at least one endpoint device 506. In some examples, a constraint module 510 may constrain a training session for neural network 516 to reduce the size in memory of the difference between a previous set of values of matrices 520 a new set of values of matrices. After one or more training sessions, creation module 512 may create a delta update 518 for neural network 516 that describes the difference between the previous set of values of matrices 520 and the new set of values. Next, update module 514 may update neural network 516 on endpoint device 506 to the new state by sending delta update 518 from training computing device 502 to endpoint computing device 506. In some embodiments, endpoint computing device 506 may then perform an element-wise addition operation on the previous set of values and the difference to arrive at the new set of values.

In some embodiments, the systems described herein may apply a loss function to the weight difference during training and/or compress the delta update in response to determining that the endpoint computing device has limited computing resources. For example, as illustrated in FIG. 6 in exemplary computer-implemented method 600, at step 610, the systems described herein may determine that a neural network trained on a computing device also operates on at least one endpoint device with limited computing resources. In one example, the systems described herein may determine that a neural network that is trained on a server to recognize visual objects also operates on an augmented reality headset with limited computing resources. At step 620, the systems described herein may apply a loss function to weight values generated during a training session for the neural network in order to reduce the size of the difference between the old weight values for the neural network and the new weight values. For example, the systems described herein may apply a least absolute deviation function to the difference between the old values and the new values. At step 630, the systems described herein may create a delta update that consists of the difference between the old weight values and the new weight values.

In some embodiments, at step 640, the systems described herein may apply a compression algorithm to the delta update. In some examples, the systems described herein may also apply an encryption algorithm to the delta update. At step 650, the systems described herein may send the compressed delta update to the endpoint device. In some embodiments, the systems described herein may send the delta update directly to the endpoint device. In other embodiments, the systems described herein may send the delta update to an intermediate device. For example, the systems described herein may send the delta update to a home augmented reality system that may then update all of the augmented reality headsets and/or other devices that are part of the home augmented reality system. At step 660, the systems described herein may update the instance of the neural network on the endpoint device by performing an element-wise addition of the delta update to the old weight values.

As discussed in connection with method 100 above, the systems and methods described herein may efficiently update neural networks by constraining neural network training to minimize the size in memory of the difference between the old values of matrices representing the weights between nodes and the new values. In some examples, in order to reduce the bandwidth and/or processing power consumed by neural network updates, the systems described herein may send delta updates rather than sending the entirety of the updated neural network. However, because delta matrices are the same dimensions as the matrices representing the weights, if a large number of weights have changed then the delta update may not be significantly smaller than the entirety of the new neural network weights. In order to create small delta updates, the systems described herein may constrain weights during training to minimize the difference between the old weights and the new weights. In some examples, this may involve minimizing the quantity of non-zero values, minimizing the absolute values of the differences, minimizing the amount of unique values in the difference, and/or minimizing any other features of the difference that lead to a smaller size in memory of the difference itself and/or a compressed version of the difference. By reducing the size of delta updates sent to mobile devices and other endpoint devices, the systems and methods described herein may improve users' experiences without sacrificing neural network quality.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive neural network training data to be transformed, transform the neural network training data by calculating updated weights, output a result of the transformation to update the neural network, use the result of the transformation to create a delta update, and store the result of the transformation to create a delta update for transmission. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method, at least a portion of the method being performed by a computing device comprising at least one processor, the method comprising:
    identifying a neural network that comprises a plurality of sets of interconnected nodes represented at least in part by a plurality of matrices and that is trained on a training computing device and executes on at least one endpoint device, wherein the plurality of matrices each comprise a plurality of weights that are each represented as a numeric value;
    constraining a training session for the neural network by reducing an absolute value of at least one numeric value that represents a difference between a weight within the previous set of values and a weight within the new set of values, thereby reducing a size in memory of a difference between a previous set of values of the plurality of matrices representing the neural network prior to the training session and a new set of values of the plurality of matrices representing the neural network after the training session;
    creating a delta update for the neural network that describes the difference between the previous set of values of the plurality of matrices and the new set of values of the plurality of matrices; and
    updating the neural network on the endpoint device to a new state by sending the delta update from the training computing device to the endpoint computing device.

2. The computer-implemented method of claim 1, wherein constraining the training session for the neural network to reduce the size in memory of the difference between the previous set of values prior to the training session and the new set of values after the training session comprises applying a loss function to the difference between the previous set of values and the new set of values.

3. The computer-implemented method of claim 1, wherein constraining the training session for the neural network to reduce the size in memory of the difference between the previous set of values and the new set of values reduces a size of a data transmission between the training computing device and the endpoint device.

4. The computer-implemented method of claim 1, wherein constraining the training session for the neural network to reduce the size in memory of the difference between the previous set of values and the new set of values comprises reducing a quantity of non-zero values in a set of matrices that represent the difference.

5. The computer-implemented method of claim 1, wherein creating the delta update for the neural network comprises creating a set of matrices that, when used to perform an element-wise addition operation upon the previous set of values, produce the new set of values.

6. The computer-implemented method of claim 1, wherein creating the delta update comprises performing a compression operation on data that describes the difference between the previous set of values of the plurality of matrices and the new set of values of the plurality of matrices.

7. The computer-implemented method of claim 1, wherein constraining the training session for the neural network comprises constraining the training session to produce a difference with a limited set of distinct values and thereby improve a compressibility of the difference.

8. The computer-implemented method of claim 1, wherein constraining the training session for the neural network is in response to determining that the endpoint device comprises a mobile device with limited computing resources.

9. A system comprising:
    an identification module, stored in memory, that identifies a neural network that comprises a plurality of sets of interconnected nodes represented at least in part by a plurality of matrices and that is trained on a training computing device and executes on at least one endpoint device, wherein the plurality of matrices each comprise a plurality of weights that are each represented as a numeric value;
    a constraint module, stored in memory, that constrains a training session for the neural network by reducing an absolute value of at least one numeric value that represents a difference between a weight within the previous set of values and a weight within the new set of values, thereby reducing a size in memory of a difference between a previous set of values of the plurality of matrices representing the neural network prior to the training session and a new set of values of the plurality of matrices representing the neural network after the training session;

a creation module, stored in memory, that creates a delta update for the neural network that describes the difference between the previous set of values of the plurality of matrices and the new set of values of the plurality of matrices;

an update module, stored in memory, that updates the neural network on the endpoint device to a new state by sending the delta update from the training computing device to the endpoint computing device; and at least one physical processor that executes the identification module, the constraint module, the creation module, and the update module.

10. The system of claim 9, wherein the constraint module constrains the training session for the neural network to reduce the size in memory of the difference between the previous set of values prior to the training session and the new set of values after the training session by applying a loss function to the difference between the previous set of values and the new set of values.

11. The system of claim 9, wherein the constraint module constrains the training session for the neural network to reduce the size in memory of the difference between the previous set of values and the new set of values in order to reduce a size of a data transmission between the training computing device and the endpoint device.

12. The system of claim 9, wherein the constraint module constrains the training session for the neural network to reduce the size in memory of the difference between the previous set of values and the new set of values by reducing a quantity of non-zero values in a set of matrices that represent the difference.

13. The system of claim 9, wherein the creation module creates the delta update for the neural network by creating a set of matrices that, when used to perform an element-wise addition operation upon the previous set of values, produce the new set of values.

14. The system of claim 9, wherein the creation module creates the delta update by performing a compression operation on data that describes the difference between the previous set of values of the plurality of matrices and the new set of values of the plurality of matrices.

15. The system of claim 9, wherein the constraint module constrains the training session for the neural network by constraining the training session to produce a difference with a limited set of distinct values and thereby improve a compressibility of the difference.

16. A non-transitory computer-readable medium comprising: one or more computer-readable instructions that, when executed by at least one processor of a computing device, cause the computing device to:

identify a neural network that comprises a plurality of sets of interconnected nodes represented at least in part by a plurality of matrices and that is trained on a training computing device and executes on at least one endpoint device, wherein the plurality of matrices each comprise a plurality of weights that are each represented as a numeric value;

constrain a training session for the neural network by reducing an absolute value of at least one numeric value that represents a difference between a weight within the previous set of values and a weight within the new set of values, thereby reducing a size in memory of a difference between a previous set of values of the plurality of matrices representing the neural network prior to the training session and a new set of values of the plurality of matrices representing the neural network after the training session;

create a delta update for the neural network that describes the difference between the previous set of values of the plurality of matrices and the new set of values of the plurality of matrices; and update the neural network on the endpoint device to a new state by sending the delta update from the training computing device to the endpoint computing device.

\* \* \* \* \*